F. B. HALL.
Stock-Car.

No. 215,119. Patented May 6, 1879.

WITNESSES:
Henry N. Miller
C. Sedgwick

INVENTOR:
F. B. Hall
BY Munn & Co
ATTORNEYS.

UNITED STATES PATENT OFFICE.

FRANKLIN B. HALL, OF PALATINE BRIDGE, NEW YORK.

IMPROVEMENT IN STOCK-CARS.

Specification forming part of Letters Patent No. 215,119, dated May 6, 1879; application filed January 22, 1879.

*To all whom it may concern:*

Be it known that I, FRANKLIN B. HALL, of Palatine Bridge, in the county of Montgomery and State of New York, have invented a new and useful Improvement in Cattle-Cars, of which the following is a specification.

This invention relates specifically to improvements designed to afford a rest or support for the cattle during transportation; and it has for its object to prevent the cattle from lying down or falling to the floor of the car, whereby so many are injured by being trampled upon and gored.

It consists of a belt attached to and supported on hangers depending from the car-roof, which is passed under the body of each of the cattle, whereby they are kept apart, and a support is furnished them when they want to rest themselves without lying down on the floor.

Figure 1:
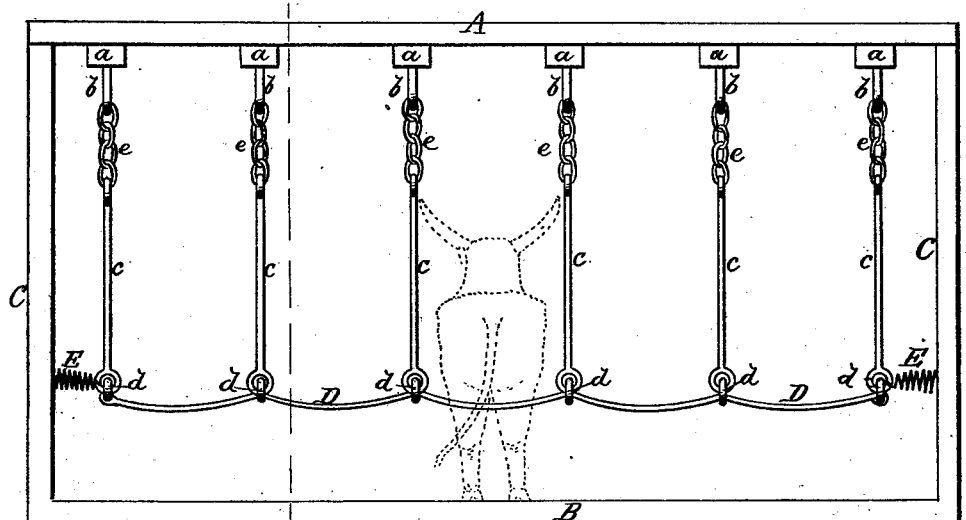
Figure 2:
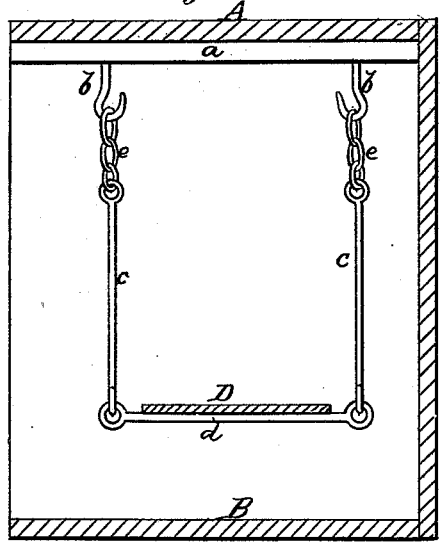
Figure 3:
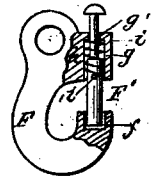

In the accompanying drawings, Figure 1 represents a side view of the interior of a cattle-car provided with my improvements. Fig. 2 is cross-section of the same on line $x\,x$; and Fig. 3 shows a snap-hook for connecting the apparatus with the car.

Similar letters of reference indicate corresponding parts.

Referring to the drawings, A represents the top of the cattle-car on the transverse carlings $a$. B is the bottom, and C C are the ends.

In the carlings are placed hooks $b$, from which depend links $c\,c$, connected together at their lower ends by bars $d$, forming hangers or swings, there being one to each carling, and sufficiently far apart to admit a steer between them, as shown in Fig. 1.

D represents a belt made of rubber, leather, or a woven fabric, which is supported on the cross-bars of the hangers. The ends of the belt being fixed or fastened securely to the cross-bars $d$, the end swings, while it is only held up on the intermediate bars. This belt is passed under the bodies of the cattle, and serves to support them, or as a rest if they have an inclination to lie down.

The manner of using the device is as follows: The links $c$ are provided with open chain-links $e$, so as to enable them to be quickly and easily hooked and unhooked from their supports $b$. Before driving the cattle in the car, the swings and belt are taken down, so there will be no obstruction to their entrance nor to their arrangement in the car. They are then driven in and made to stand crosswise of the car. The belt D is then adjusted under their bodies and over the cross-bars, and then the hangers or swings are suspended from the hooks, one on either side of the animal, in the manner shown in Fig. 1.

Now, if the cattle wish to rest themselves, they cannot lie down, but they rest on the belt, which furnishes a firm support for them.

By arranging the car in this manner the many accidents that occur by the cattle being gored and trampled upon when lying on the floor will be avoided, as they can neither lie down voluntarily nor fall, owing to the supporting-belt.

In addition, the animals are separated from each other, and the arrangement offers an insurmountable obstacle to overcrowding the cars.

To prevent sudden shocks and jars the end swings are connected with the ends of the cars by strong springs E E, which not only relieves the swings from a too sudden jerk, but also limits the movement of the belt, so that if but one animal lies down or supports itself the belt will not sag too far to keep him off the floor.

To unload the car, the swings and belt must be lowered to the floor or entirely removed.

In place of the bars $d$ to sustain the belt, ropes may be employed, and the belt may be made of several layers of or thicknesses of woven material cemented together; and, instead of using a single belt running the whole length of the car, it may be made in sections, and each section attached at both ends to the cross-bar separately, so that the cattle can support themselves independently. In this case the snap-hook shown in Fig. 3 would be used. This is composed of a hook, F, in the end whereof is a socket, $f$, and just above is an eye, $g$, with a reduced portion, $g'$, at the top. A bolt, F', is placed with its neck portion in this eye, and is provided with a spiral spring, $h$, wrapped around this neck, one end bearing against the shoulder $i$ in the eye, and the other against a pin, $i'$, in the bolt, while the lower end is placed in the socket. This snap is hung from the carlings $a$, and the links $e$ of the rods $c$ are connected with it by lifting the bolt $F'$ out of its socket, slipping the link in, and then allowing the bolt to fall in the socket, where it is held by the spring. By this arrangement the apparatus can be connected with and disconnected from the car very quickly and easily.

Having thus described my invention, I claim as new and desire to secure by Letters Patent—

1. A swing for cattle-cars, consisting of the belt D, eye rods or links $c\ d$, and chains $e$, the latter suspended from hooks in the roof of car, as shown and described.

2. The springs E, fixed to the ends of the car and to the end swings, in combination with the swings and belt D, as and for the purpose described.

FRANKLIN BYRON HALL.

Witnesses:
LEWIS HENDRICKS,
MARTIN SCHENCK.